United States Patent
Yamamoto et al.

(10) Patent No.: US 12,256,157 B2
(45) Date of Patent: Mar. 18, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Masashi Yamamoto, Kanagawa (JP); Taisuke Nishio, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 17/899,476

(22) Filed: Aug. 30, 2022

(65) Prior Publication Data

US 2023/0070353 A1 Mar. 9, 2023

(30) Foreign Application Priority Data

Sep. 9, 2021 (JP) .................................. 2021-146785
Jun. 30, 2022 (JP) .................................. 2022-106164

(51) Int. Cl.
*H04N 23/88* (2023.01)
*H04N 23/56* (2023.01)

(52) U.S. Cl.
CPC ............. *H04N 23/88* (2023.01); *H04N 23/56* (2023.01)

(58) Field of Classification Search
CPC ............................ H04N 23/88; H04N 1/6077
USPC ....................................................... 348/223.1
See application file for complete search history.

(56) References Cited

U.S. PATENT DOCUMENTS

| | | | |
|---|---|---|---|
| 2002/0018129 A1* | 2/2002 | Ikeda | H04N 23/88 348/223.1 |
| 2015/0350620 A1* | 12/2015 | Kuchiki | H04N 25/134 348/223.1 |
| 2016/0295189 A1* | 10/2016 | Fujiwara | H04N 23/743 |
| 2019/0158796 A1* | 5/2019 | Wang | H04N 23/88 |
| 2022/0329769 A1* | 10/2022 | Hsu | H04N 9/7973 |
| 2023/0379591 A1* | 11/2023 | Kaise | H04N 23/88 |

FOREIGN PATENT DOCUMENTS

| | | | |
|---|---|---|---|
| JP | 2005130317 A | 5/2005 | |
| WO | WO-2021104352 A1 * | 6/2021 | ............ H04N 9/045 |

* cited by examiner

*Primary Examiner* — Anthony J Daniels
(74) *Attorney, Agent, or Firm* — Canon U.S.A., Inc. IP Division

(57) ABSTRACT

An apparatus includes an acquisition unit configured to acquire a first control value related to white balance based on an input image, a determination unit configured to determine whether a first area including the acquired first control value is changeable, a control unit configured to change the first area to a second area based on a result of determination by the determination unit, and a calculation unit configured to calculate a second control value related to the white balance to be applied to the input image in the second area in a case where the first area is changed to the second area, wherein the control unit changes the first area to the second area by stages.

21 Claims, 13 Drawing Sheets

FIG.12
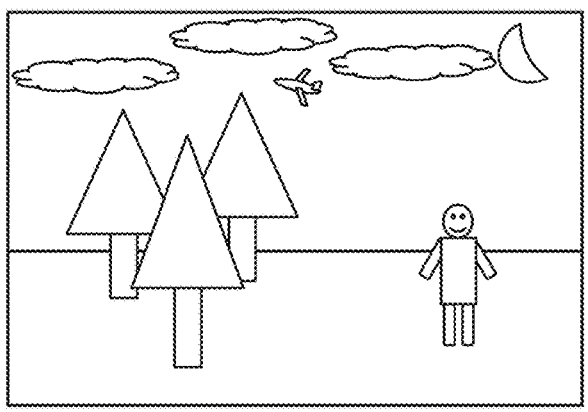
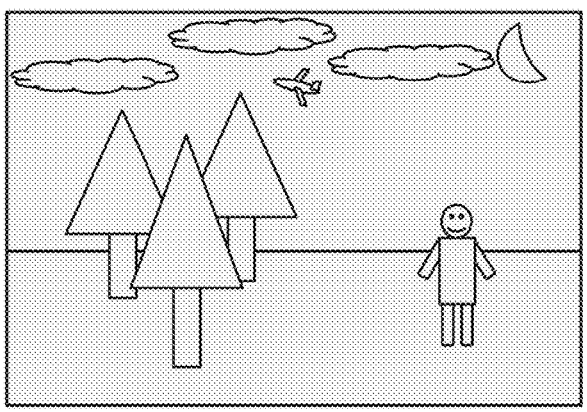
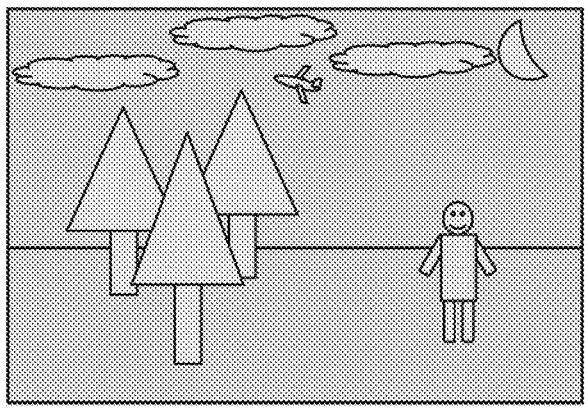
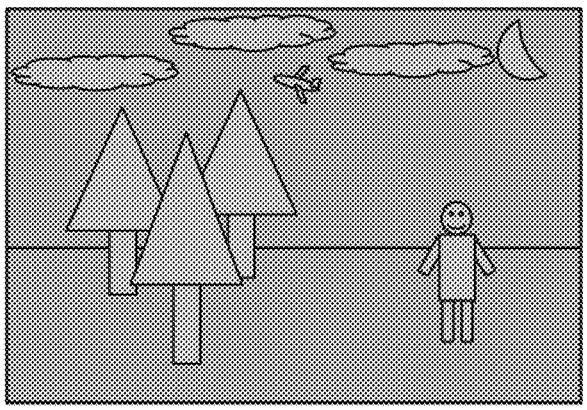

IMAGE PROCESSING APPARATUS, IMAGE PROCESSING METHOD, AND STORAGE MEDIUM

BACKGROUND

Technical Field

The aspect of the embodiments relates to an image processing apparatus, an image processing method, and a storage medium.

Description of the Related Art

Japanese Patent Application Laid-Open No. 2005-130317 discusses a technique of switching a white balance control method depending on a position of an infrared cut filter that is a mechanism for not taking in an infrared light component.

SUMMARY

According to an aspect of the embodiments, an apparatus includes an acquisition unit configured to acquire a first control value related to white balance based on an input image, a determination unit configured to determine whether a first area including the acquired first control value is changeable, a control unit configured to change the first area to a second area based on a result of determination by the determination unit, and a calculation unit configured to calculate a second control value related to the white balance to be applied to the input image in the second area in a case where the first area is changed to the second area by the control unit, wherein the control unit changes the first area to the second area by stages.

Further features of the disclosure will become apparent from the following description of exemplary embodiments with reference to the attached drawings.

BRIEF DESCRIPTION OF THE DRAWINGS

FIG. 12 illustrates an example of a UI according to the third exemplary embodiment.

DESCRIPTION OF THE EMBODIMENTS

Figure 1:
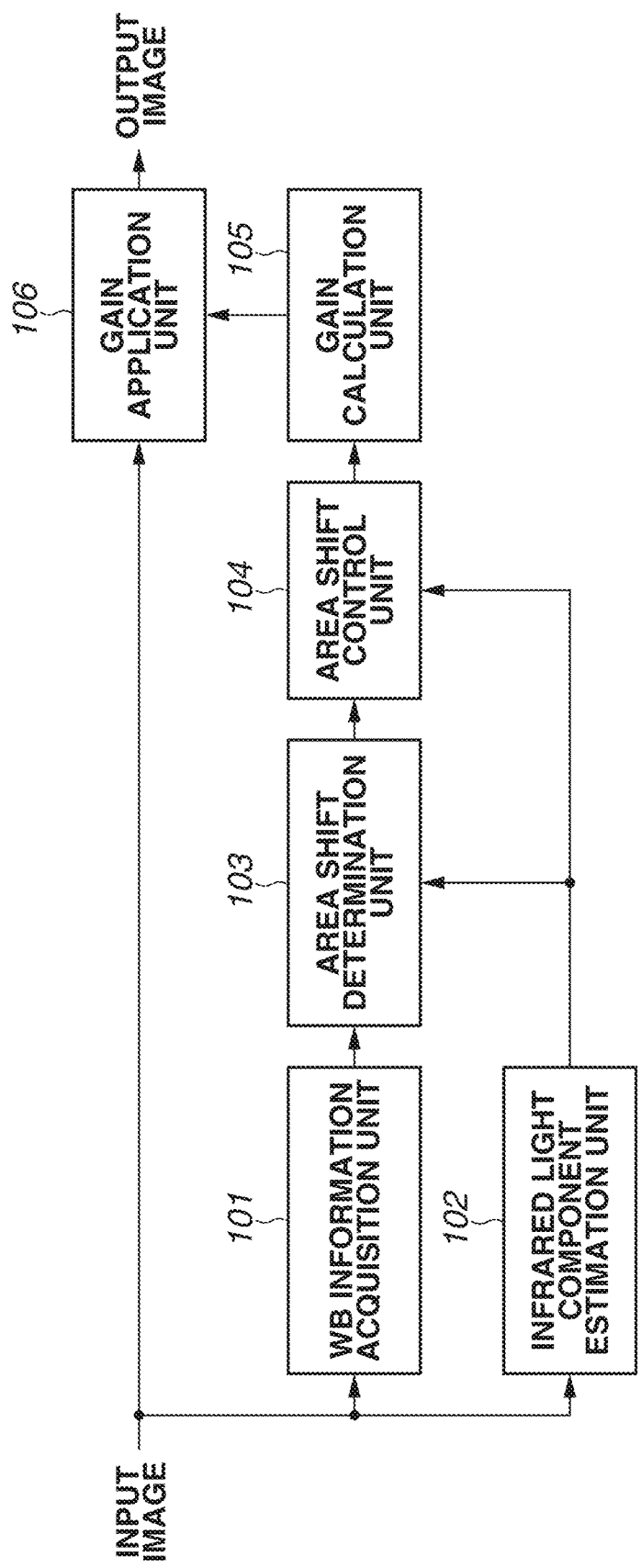
FIG. 1 illustrates a configuration example of an image processing apparatus according to a first exemplary embodiment.

Various exemplary embodiments of the disclosure will be described in detail below with reference to the attached drawings.

The exemplary embodiments which will be described below do not restrict the disclosure according to the claims, and all of combinations of the features described in the exemplary embodiments are not always essential to the means for solution according to the disclosure. The configurations of the exemplary embodiments can be appropriately modified and changed according to a specification and various conditions (a usage condition, a usage environment, and the like) of an apparatus to which the disclosure is applied. Parts of the exemplary embodiments described below may be appropriately combined. Same components are denoted by the same reference numerals in the following exemplary embodiments.

FIG. 1 is a block diagram illustrating a configuration example of an image processing apparatus according to a first exemplary embodiment of the disclosure. The image processing apparatus according to the first exemplary embodiment is described with reference to FIG. 1. The image processing apparatus according to the present exemplary embodiment is built in or connected to an image capturing apparatus such as a digital camera and a monitoring camera.

An input image represents an image captured by an imaging unit that is built in or connected to the image processing apparatus and includes a lens and an imaging sensor. The input image is image data or an image signal including a plurality of pixels and includes information about a plurality of colors. The plurality of colors includes, for example, red, green, and blue. The image data is data that passes through a color filter corresponding to each color provided on the imaging sensor built in or connected to the image processing apparatus and is converted into an electrical signal by the imaging sensor. The color filter transmits not only visible light corresponding to red, green, and blue but also a part of infrared light (invisible light). A commonly used image capturing apparatus is provided with, for example, an infrared cut filter to remove an infrared light component in consideration of an influence of the infrared light component so that an image close to human visual sensitivity can be acquired. The imaging sensor includes an image capturing element such as a complementary metal oxide semiconductor (CMOS) and a charge-coupled device (CCD).

An output image represents an image of which white balance is appropriately corrected by applying a white balance gain that is a final white balance control value calculated as described below to a pixel value of the input image. In the following description, white balance is referred to as WB as appropriate. The image processing apparatus according to the present exemplary embodiment performs WB control depending on whether the input image is affected by the infrared light component captured by the built-in or connected imaging sensor and thus acquires the output image of which the WB is appropriately corrected.

A WB information acquisition unit 101 acquires a WB state and outputs the WB state to an area shift determination unit 103.

The WB state includes a WB control method, a WB gain control value, and a WB gain target value used in the digital camera or the monitoring camera that is connected to the image processing apparatus. The WB control method includes, for example, a manual method for setting a fixed WB gain control value and an automatic method for automatically calculating a WB gain control value corresponding to an imaging environment. The WB gain control value is a value obtained to follow the WB gain target value calculated in a predetermined area based on a characteristic amount related to the color of the input image. The characteristic amount related to the color of the input image is color information of each area determined by the image data included in an area obtained in a case where the input image is equally divided into a plurality of areas. Specifically, the characteristic amount related to the color is a representative value of a color difference signal of each equally divided area, and the representative value is, for example, an average value and a mode value. The predetermined area is an area in which it is determined in advance how much color is drawn in and corrected as white based on ambient light, a spectral characteristic of a sensor, and the like in order to apply an appropriate WB gain control value. The predetermined area is formed of three or more points indicating a value of the WB gain, and in the following description, the predetermined area is referred to as a drawing-in area. The WB gain control value is calculated in the drawing-in area. The WB gain control value is applied to the input image, and thus the output image of which the WB is more appropriately corrected than the input image can be obtained.

The WB gain target value is a convergence value of the WB gain control value to be obtained in order to appropriately control the WB of the output image. The WB gain target value may be determined based on the color information about the input image, or a fixed value or a limit value may be set to the WB gain target value. Specifically, there is a case where the representative value of the color information about the input image is calculated based on the color information about each area with respect to the input image, and the WB gain target value is calculated so that the representative value of the color information about the output image will be a predetermined value. There are a case where the fixed value is set by the manual method and a case where the limit value for preventing the WB gain control value from being calculated on the outside of the drawing-in area in an environment which is not affected by the infrared light component is set in the drawing-in area. According to the present exemplary embodiment, the WB gain to be used for the WB control includes, for example, a red gain (hereinbelow, referred to as the R gain) for adjusting redness of an image and a blue gain (hereinbelow, referred to as the B gain) for adjusting blueness of the image.

An infrared light component estimation unit 102 estimates to what extent the color of the input image is affected by the infrared light component captured by the imaging sensor based on the characteristic amount related to the color of the input image and outputs the estimation result to the area shift determination unit 103. Specifically, the infrared light component estimation unit 102 calculates an average value of the color information about the input image, estimates that the influence of the infrared light component is larger as a red color component of the calculated color average value is larger, and estimates that the influence of the infrared light component is smaller as the red color component of the calculated color average value is smaller.

The area shift determination unit 103 determines whether the drawing-in area for acquiring an appropriate WB gain control value can be shifted based on inputs from the WB information acquisition unit 101 and the infrared light component estimation unit 102 and outputs the determination result to an area shift control unit 104. Specifically, the area shift determination unit 103 determines whether the current drawing-in area can be shifted from information about the WB control method that is obtained from the WB information acquisition unit 101 and a relationship of the WB gain control value and the WB gain target value to the drawing-in area.

More specifically, the relationship of the WB gain control value and the WB gain target value to the drawing-in area indicates at which point in the drawing-in area the current WB gain control value is calculated and at which point the WB gain target value is set with respect to the drawing-in area. In other words, the relationship of the WB gain control value and the WB gain target value to the drawing-in area indicates at which points a calculated value of the WB gain control value and a set position of the WB gain target value are respectively located in the drawing-in area. For example, as one of conditions in a case where the drawing-in area can be shifted, there is a case where the WB gain control value is located on an edge of the drawing-in area, that is, a boundary line of the area. Based on the input from the infrared light component estimation unit 102, it is determined whether the drawing-in area can be shifted from magnitude of the influence of the infrared light component on the input image. Specifically, in a case where an estimated value of the infrared light component received by the current input image exceeds a predetermined threshold value, it is determined that the drawing-in area can be shifted. A condition for determining whether the drawing-in area can be shifted is multiplication of a plurality of conditions. Specifically, it is determined that the current drawing-in area can be shifted in a case where following conditions (a) to (d) are satisfied.

(a) The WB control method is set to the automatic method.
(b) A ratio of the infrared light component to a visible light component exceeds the predetermined threshold value.
(c) The WB gain target value is set outside the drawing-in area.
(d) The current WB gain control value is located on the edge of the drawing-in area (on the boundary line between inside and outside of the drawing-in area).

The area shift control unit 104 controls the drawing-in area in response to the inputs from the infrared light component estimation unit 102 and the area shift determination unit 103 and outputs information about the drawing-in area after the control to a gain calculation unit 105. Specifically, the area shift control unit 104 controls which area of adjacent areas the current drawing-in area is shifted to based on the ratio of the infrared light component and the determination result of whether the area can be shifted so as to cancel the influence of the infrared light component. For example, in a case where the ratio of the infrared light component is high, the WB gain target value is set outside the current drawing-in area, and the WB gain control value is located on the boundary line of the drawing-in area, the drawing-in area is shifted in a direction in which the influence of the infrared light component is canceled.

The gain calculation unit 105 receives information after controlling the drawing-in area from the area shift control unit 104 and calculates the WB gain control value for appropriately performing the WB control on the output image in the drawing-in area after the shift. Specifically, as a calculation method of the WB gain control value, the WB gain control value is calculated to follow the WB gain target value as described above. At this time, the WB gain control value is calculated in the drawing-in area after the shift.

A gain application unit 106 acquires an appropriate WB gain control value from the gain calculation unit 105, multiplies the WB gain control value by the input image, thus generates and outputs an output image to which the WB control is applied.

Figure 2:
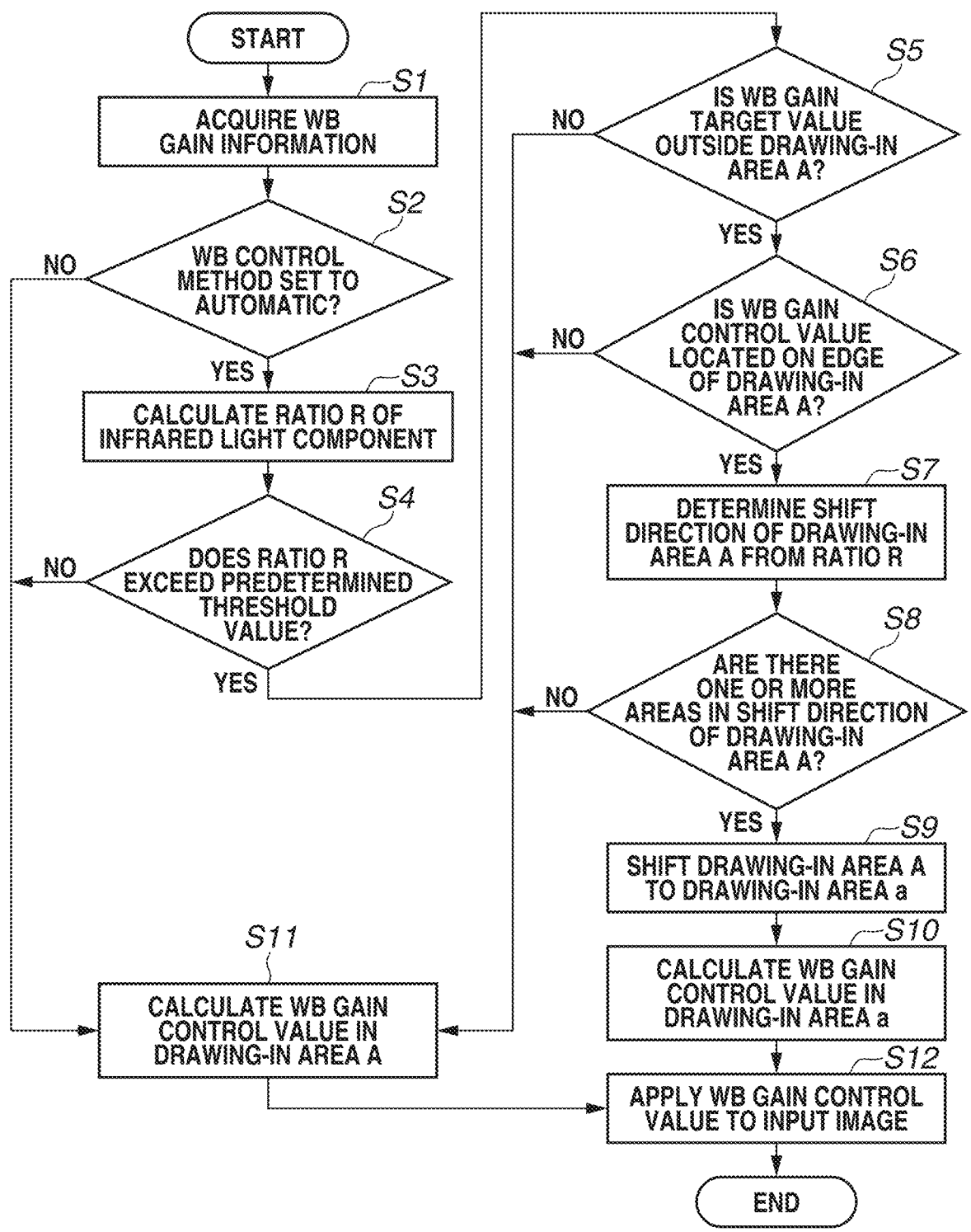
FIG. 2 is a flowchart illustrating a series of processes of a main part of image processing according to the present exemplary embodiment.

FIG. 2 is a flowchart illustrating an example of a series of processes of a main part of image processing executed by the image processing apparatus according to the present exemplary embodiment. The example of the image processing apparatus according to the present exemplary embodiment is described with reference to the flowchart in FIG. 2. In the following description of the flowchart, a processing step is represented by a symbol "S".

First, in step S1, the WB information acquisition unit 101 acquires the WB state (the WB control method, the WB gain control value, and the WB gain target value), namely WB gain information, from a setting value of a connecting device and information about the color of the input image.

In step S2, the area shift determination unit 103 determines whether a drawing-in area A (hereinbelow, referred to as the area A) can be shifted based on the WB control method in the WB gain information acquired in step S1. For example, in a case where the WB control method is set to the automatic method or the like in which the drawing-in area can be shifted (YES in step S2), a first condition for shifting the area A is achieved, and the processing proceeds to step S3. Alternatively, in a case where the manual method, a preset method, or the like is specified as the WB control method, and the setting is to fix the drawing-in area (NO in step S2), the area A is not shifted, so that the subsequent processing proceeds to step S11.

In step S3, the infrared light component estimation unit 102 estimates the influence of the infrared light component and calculates a ratio R of the infrared light component to the visible light component.

In step S4, the area shift determination unit 103 determines whether the area A can be shifted based on the ratio R calculated in step S3. For example, in a case where the ratio R exceeds the predetermined threshold value (YES in step S4), a second condition for shifting the area A is satisfied, and the processing proceeds to step S5. Alternatively, in a case where the ratio R does not exceed the predetermined threshold value (NO in step S4), the area A is not shifted, so that the subsequent processing proceeds to step S11.

In step S5, the area shift determination unit 103 determines whether the area A can be shifted based on the WB gain target value in the WB gain information acquired in step S1. For example, in a case where the WB gain target value is outside the area A (YES in step S5), a third condition for shifting the area A is satisfied, and the processing proceeds to step S6. Alternatively, in a case where the WB gain target value is set inside the area A (NO in step S5), the area A is not shifted, so that the subsequent processing proceeds to S11.

In step S6, the area shift determination unit 103 determines whether the area A can be shifted based the WB gain control value in the WB gain information acquired in step S1. For example, in a case where the WB gain control value is located on the edge namely the boundary line of the area A (YES in step S6), a fourth condition for shifting the area A is satisfied, and the processing proceeds to step S7. Alternatively, in a case where the WB gain control value is not located on the boundary line of the area A (NO in step S6), the area A is not shifted, so that the subsequent processing proceeds to step S11.

In step S7, a direction in which the area A is shifted is determined based on the ratio R of the infrared light component calculated by the infrared light component estimation unit 102. For example, in a case where the ratio R exceeds the predetermined threshold value on a side affected by the infrared light component, the direction in which the area A is shifted is determined to be a direction in which the influence of the infrared light component is cancelled. On the other hand, in a case where the ratio R is lower than the predetermined threshold value in a direction in which the influence of the infrared light component is reduced, the direction in which the area A is shifted is determined to be a direction in which influence of the visible light component is taken into consideration more than the influence of the infrared light component. If the direction in which the area A is shifted is determined, the processing proceeds to step S8.

In step S8, the area shift determination unit 103 determines whether the area A can be shifted based on the direction in which the area A is shifted as determined in step S7. For example, in a case where a next area is set on the side of the direction in which the area A is shifted (YES in step S8), a fifth condition for shifting the area A is satisfied, and the processing proceeds to step S9. Alternatively, in a case where the WB gain target value is set inside the area A (NO in step S8), the area A is not shifted, so that the subsequent processing proceeds to S11.

In step S9, the area shift control unit 104 shifts the area A to an area a that is different from the area A based on the result of determining whether the area A can be shifted in step S8 and the direction of the area A is shifted as determined in step S7. Specifically, in a plurality of drawing-in areas set by stages in advance, there is the area a to which the area A can be shifted in the direction determined in step S7 based on the determination result in step S8 with respect to the current area A. Although details are to be described below with reference to the drawings, the area A is shifted to the shiftable area a, and the processing proceeds to step S10.

In step S10, the gain calculation unit 105 calculates a new WB gain control value for appropriately performing the WB control on the input image in the area a to which the area A is shifted in step S9. Specifically, the WB gain control value is calculated inside the area a so as to follow the WB gain target value. At this time, the WB gain target value does not have to be set inside the area a after the area A is shifted.

In this case, the WB gain control value is calculated on the boundary line of the area a closest to the WB gain target value. Subsequently, the processing proceeds to step S12.

In step S11, in a case where the area shift determination unit 103 determines that the area A cannot be shifted, the gain calculation unit 105 calculates the WB gain control value for appropriately performing the WB control on the input image in the area A. Specifically, the WB gain control value is calculated inside the area A so as to follow the WB gain target value. At this time, the calculated WB gain control value may be the same as the WB gain control value acquired in step S1. For example, there is a case where it is determined that the area A cannot be shifted because the WB gain target value is set outside the area A, the WB gain control value is located on the boundary line of the area A, and there is not one or more areas in the shift direction of the area A. In a case where the WB gain control value is calculated, the processing proceeds to step S12.

In step S12, the gain application unit 106 multiplies the input image by the WB gain control value calculated in step S10 or S11 and outputs the output image in which the WB is appropriately corrected.

The WB control and its effect according to the present exemplary embodiment are described.

Figure 3:
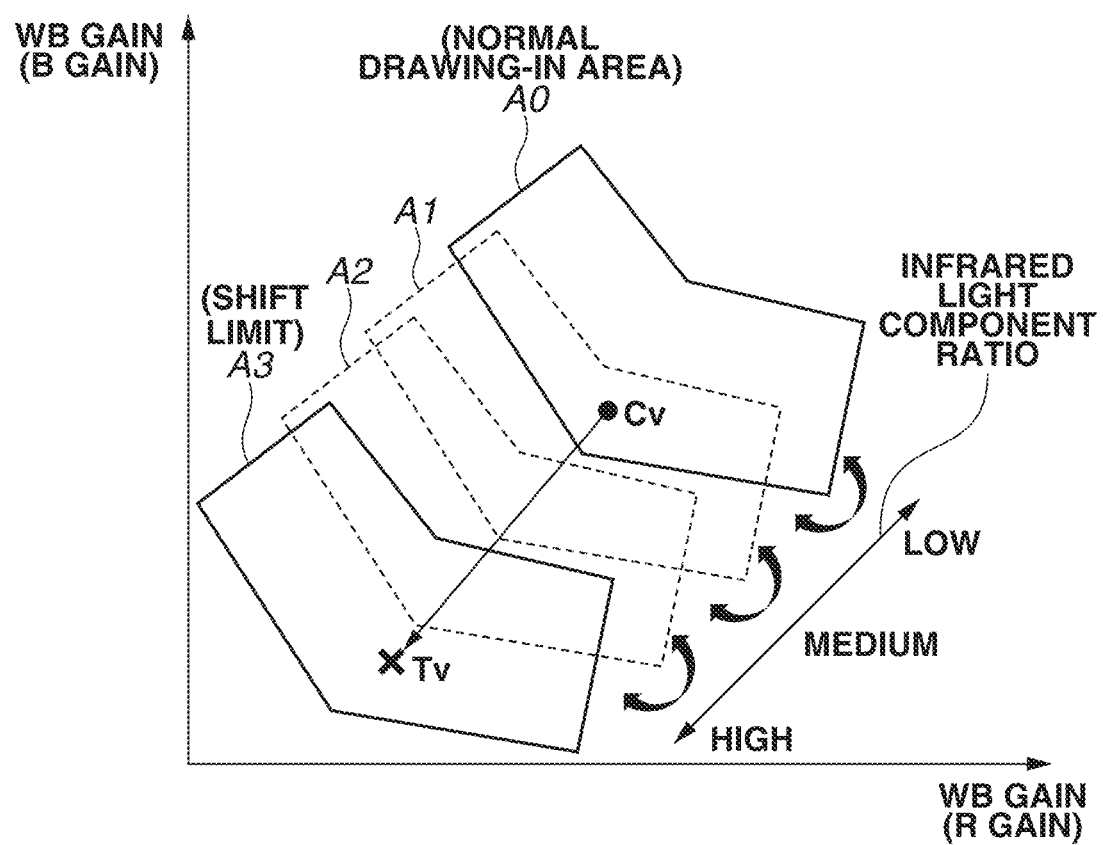
FIG. 3 illustrates a first example of white balance (WB) gain control according to the first exemplary embodiment.

FIG. 3 illustrates a first example of the WB control that is an example of the WB gain control according to the present exemplary embodiment.

In FIG. 3, a predetermined area A0 represents an area in which the WB gain control value is calculated in a case where the color of the input image is not affected by the infrared light component. A predetermined area A3 represents an area in which the WB gain control value is calculated in a case where the color of the input image is most affected by the infrared light component. In other words, as the color of the input image is more affected by the infrared light component with respect to the current drawing-in area, the drawing-in area is further shifted toward the area A3 in a lower left part in FIG. 3. As the influence of the infrared light component is reduced, the drawing-in area is shifted toward the area A0. Areas A1 and A2 are set in advance for shifting the area by stages between the area A0 and the area A3. In the example according to the present exemplary embodiment illustrated in FIG. 3, the areas A1, A2, and A3 are each set to have the same size as that of the area A0, and the areas A1 and A2 are arranged to linearly overlap with each other at equal intervals between the area A0 and the area A3.

A black dot in the drawing indicates the WB gain control value, which is expressed as Cv. A black cross mark in the drawing indicates the WB gain target value, which is expressed as Tv. The black dot Cv and the black cross mark Tv illustrated in the following drawings respectively represent the WB gain control value and the WB gain target value. As already described above, the WB gain according to the present exemplary embodiment includes the R gain for adjusting redness of the image and the B gain for adjusting blueness of the image. Positions of the Cv and the Tv in the drawing are determined based on the respective R gain and B gain.

In general ambient light, the infrared light component is dominant over the visible light component as illuminance is lowered, and the ratio of the infrared light component gradually increases. According to the present exemplary embodiment, automatic white balance control in a case where an image is irradiated with infrared light and rapidly affected by the infrared light component from a state where there is almost no infrared light component is described as an example. As the drawing-in areas, the areas A0, A1, A2, and A3 in FIG. 3 are arranged in advance. It is assumed that the Tv is set at the same position as the Cv before irradiation of the infrared light, and the drawing-in area at this time is hardly affected by the infrared light component and thus is the area A0, which is a normal drawing-in area. In a case where the image is irradiated with the infrared light here, the ratio of the infrared light component increases, and the color of the image becomes reddish, so that the WB gain target value moves to the position of the Tv in FIG. 3 in order to correct the tint. Because the WB gain control value is calculated inside the drawing-in area, in case where the Tv is located at the position in FIG. 3, the Cv is located on the boundary line of the area A0 closest to the Tv in the area A0, which is the current drawing-in area. At this time, the ratio of the infrared light component exceeds the predetermined threshold value with respect to the area A0. The WB gain target value is located outside the current area A0, the WB gain control value is located on the boundary line of the current area A0, and the area A1 after the shift is located ahead in the direction in which the area is shifted. Thus, it is determined that the area A0 can be shifted. Because the area is shifted by stages, the area A0 is shifted to the area A1. A new WB gain control value is calculated so as to approach the Tv in the area A1 after the shift. The Cv gradually approaches the Tv, and when reaching the boundary line of the area A1, the ratio of the infrared light component exceeds the predetermined threshold value with respect to the area A1. The WB gain target value is located outside the current area A1, and the WB gain control value is located on the boundary line of the current area A1. Because the area A2 after the shift is located ahead in the direction in which the area is shifted, it is determined that the area A1 can be shifted. Because the area is shifted by stages, the area A1 is shifted to the area A2. These processes are repeated up to the limit where the Cv can approach the Tv. In the example in FIG. 3, the area is shifted to the area A3, and since the Tv is included in the area A3, the Cv is calculated as the same value as the Tv.

In case where irradiation of the infrared light is stopped and the light is returned to the initial ambient light, the ratio of the infrared light component decreases, and the visible light component becomes dominant, so that the Tv returns to the initial position, namely the position of the Cv in the area A0 in FIG. 3. At this time, the Cv that has moved to the position of the Tv illustrated in FIG. 3 by the influence of the infrared light component starts to move closer to the Tv that has returned to the initial position because the influence of the infrared light component is eliminated. The Cv inside the area A3 approaches the Tv inside the area A0, and when the Cv reaches the boundary line of the area A3 in the direction of the area A0, the ratio of the infrared light component exceeds the predetermined threshold value with respect to the area A3 to a lower side. The WB gain target value is located outside the current area A3, and the WB gain control value is located on the boundary line of the current area A3. Because the area A2 after the shift is located ahead in the shift direction of the area, namely a side on which the infrared light component is smaller, it is determined that the area A3 can be shifted. Because the area is shifted by stages, the area A3 is shifted to the area A2. These processes are repeated up to the limit where the Cv can approach the Tv, and in a case where the area is shifted to the area A0 and returns to the initial position, the Cv is calculated as the same value as the Tv.

In the existing white balance control, a drawing-in range is fixed to, for example, the area A0 in FIG. 3 regardless of whether the color of the input image is affected by the infrared light component or not. Thus, in a case where the color of the input image is affected by the infrared light component, an optimum WB gain control value, which is the WB gain target value in the area A3 in FIG. 3 cannot be applied. The WB gain control value that is located inside the area A0 or on the boundary line of the area A0 is applied. In a case where a difference between the WB gain control value to be actually applied and the WB gain target value, which is the optimum WB gain, is large, the white balance may be lost and the image quality may be deteriorated.

The drawing-in area is shifted from the normal area A0 to the drawing-in areas A1, A2, and A3 in which the influence of the infrared light component is taken into consideration based on a strength of the influence of the infrared light component as described in the present exemplary embodiment, and thus the WB control can be appropriately performed on an image affected by the infrared light component. Because the drawing-in area is shifted by stages, the WB gain control value is always located inside the drawing-in area, and thus it is possible to avoid an issue that the WB gain control value is located outside the drawing-in area and cannot be calculated. In a case where the image is rapidly affected by the infrared light component, the drawing-in area is shifted by stages, and the WB gain control value is gradually calculated, so that switching of the color of the image also changes gradually. In the automatic white balance control, a radical change in apparent color is not preferred, so that the WB control according to the present exemplary embodiment that can gradually change the color is effective.

The WB control according to the present exemplary embodiment can set the drawing-in area A3 in a case where the color of the input image is most affected by the infrared light component depending on sensitivity of the imaging sensor. In other words, according to the present exemplary embodiment, as the sensitivity of the imaging sensor is higher, the area A3 can be set to a position farther from a position of the normal drawing-in area A0 in a case where the color of the input image is not affected by the infrared light component. The areas can be shifted by stages by setting one or more overlapping areas between the area A0 and the area A3. The number of shift stages described in the present exemplary embodiment is three stages including the shift limit, but the number of shift stages can be freely determined if the shift of the drawing-in area is designed so that the same WB gain control value is included in the areas before and after the shift. According to the present exemplary embodiment, whether the current area can be shifted is determined based on whether the WB gain control value is located on the boundary line of the area, but the determination is not limited to this example. It is determined that the area can be shifted in a case where the WB gain control value is located near the boundary line of the area, and a user can freely determine how close the WB gain control value is to the boundary line.

In the WB control according to the present exemplary embodiment, the infrared light component estimation unit 102 estimates how much the color of the input image is affected by the infrared light component captured by the imaging sensor based on the characteristic amount related to the color of the input image, but the estimation is not limited to this example. For example, the infrared light component estimation unit 102 may estimate how much the input image is affected by the infrared light component based on an insertion/removal state of an infrared cut filter (IRCF) that is built in or connected to the image processing apparatus according to the present exemplary embodiment or an ON/OFF state of infrared light illumination in a case where an infrared light illumination unit is connected. In other words, it may be determined that the ratio of the infrared light component is high in a case where the IRCF is in the removal state, or the infrared light illumination unit emits the infrared light. It may be determined that the ratio of the infrared light component is low in a case where the IRCF is in the insertion state or the infrared light illumination unit does not emit the infrared light. Alternatively, a user may be able to set whether the color of the input image is affected by the infrared light component. In other words, a WB control mode in a case where the color of the input image is affected by the infrared light component and a WB control mode in a case where the color of the input image is not affected by the infrared light component are provided, and the user may be able to select one of the WB control modes. The user may set the ratio of the infrared light component and controls the drawing-in area based on the magnitude of the ration in the WB control mode in a case where the color of the input image is affected by the infrared light component. However, the method for shifting the area to a specified drawing-in area may follow the present exemplary embodiment, and the area is shifted by stages.

As described above, as the illuminance is lower, the ratio of the infrared light component to the visible light component becomes higher in the ambient light, so that redness of a captured image becomes stronger. In order to correct the strong redness included in the captured image, the WB gain control value is applied, which is greatly different from the WB gain control value in a case where the color of the input image is not affected by the infrared light component. As the sensitivity of the imaging sensor is higher, a signal-to-noise (SN) ratio is higher even in a low luminance environment, and a captured image that retains an original color of an object can be obtained. From the above description, as the sensitivity of the imaging sensor is higher, an effect of improving color reproducibility can be achieved by controlling the WB more actively in the low illuminance environment even in a case where the color of the input image is affected by the infrared light component. On the other hand, in a case where the WB is actively controlled in a case where the sensitivity of the imaging sensor is insufficient, the WB may be greatly disturbed due to influence of a noise. Thus, even in a case where the color of the input image is affected by the infrared light component, the WB gain control value of which a difference is small as compared with the WB gain control value in a case where the color of the input image is not affected by the infrared light component is applied, and the WB can be prevented from being greatly disturbed.

From the above description, in the WB control according to the present exemplary embodiment, as the sensitivity of the imaging sensor is higher, the WB is more actively controlled even in a case where the color of the input image is affected by the infrared light component. In other words, in the WB control according to the present exemplary embodiment, the WB gain control value which is largely different from the WB gain control value in a case where the color of the input image is not affected by the infrared light component is applied as the sensitivity of the imaging sensor is higher. Accordingly, it is possible to improve the color reproducibility of the captured image at the low illuminance while preventing the WB from being greatly disturbed.

Figure 4:
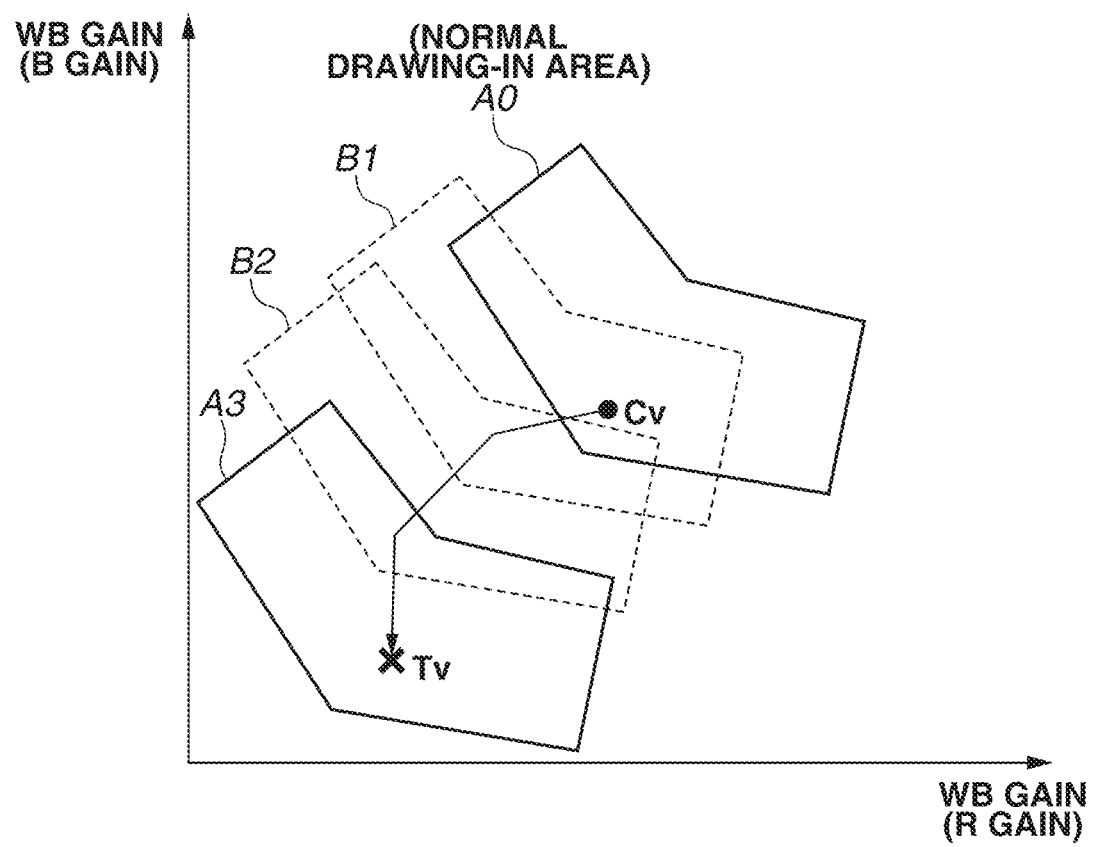
FIG. 4 illustrates a second example of WB gain control according to the first exemplary embodiment.

FIG. 4 is an example illustrating a second example of the WB control according to the present exemplary embodiment.

In the first example of the WB control, a plurality of areas is arranged to linearly overlap with each other at equal intervals in the drawing-in areas set by stages in advance by the area shift control unit 104, but the arrangement is not limited to this example. In the second example of the WB control illustrated in FIG. 4, the areas A1 and A2, which are the drawing-in areas set by stages in advance in the first example of the WB control, are replaced with areas B1 and B2. A point different from FIG. 3 is that the areas are not linearly shifted between the normal drawing-in area A0 and the area A3, which is a shiftable limit in a case where the influence of the infrared light component is the maximum. Because the influence of the infrared light component is different depending on the sensitivity and the spectral characteristic of the imaging sensor, the WB can be corrected in consideration of the influence of the infrared light component by arranging the area according to these characteristics. Specifically, in order to more actively control the R gain for adjusting the redness based on an actual measured value and the spectral characteristic of the imaging sensor with respect to an image, which becomes reddish by the influence of the infrared light component, the areas are arranged as illustrated in the areas B1 and B2 in FIG. 4 so as to reduce the R gain earlier. The positions of not only the areas arranged by stages but also the normal drawing-in area A0 and the area A3 as the shift limit may be freely designed based on the actual measured value and the characteristics of the imaging sensor.

Figure 5:
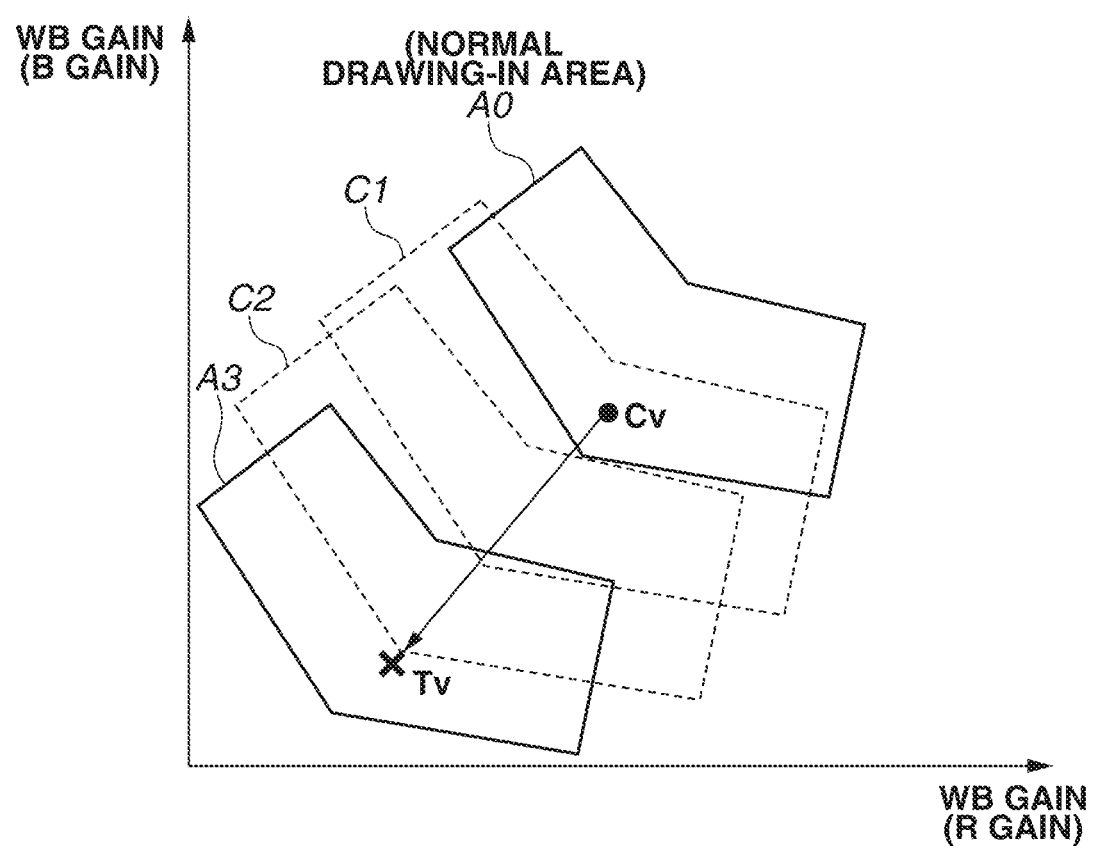
FIG. 5 illustrates a third example of WB gain control according to the first exemplary embodiment.

FIG. 5 is an example illustrating a third example of the WB control according to the present exemplary embodiment.

In the first example of the WB control, the areas A1, A2, and A3, which are the drawing-in areas set by stages in advance by the area shift control unit 104, are each set to have the same size as the area A0, but the setting is not limited to this example. In the third example of the WB control illustrated in FIG. 5, the areas A1 and A2, which are the drawing-in areas set by stages in advance in the first example of the WB control, are replaced with areas C1 and C2. A point different from FIG. 3 is that the size is not constant in the areas shifted between the normal drawing-in area A0 and the area A3, which is the shiftable limit in a case where the influence of the infrared light component is the maximum. The color of the image affected by the infrared light component is reddish and thus cannot express the correct color. The size of the drawing-in area is enlarged to actively draw in white from beginning of the influence of the infrared light component until the ratio of the infrared light component becomes constant, namely between the area C1 and the area C2 in which the drawing-in areas are shifted so that the color of the object becomes easier to approach the original color. The size of the drawing-in area can be freely designed from the actual measured value and the spectral characteristic of the imaging sensor. The sizes of not only the areas arranged by stages but also the normal drawing-in area A0 and the area A3 as the shift limit may be freely designed based on the actual measured value and the characteristics of the imaging sensor. There may be a case where the size of the area is enlarged with respect to the normal drawing-in area A0.

Figure 6:
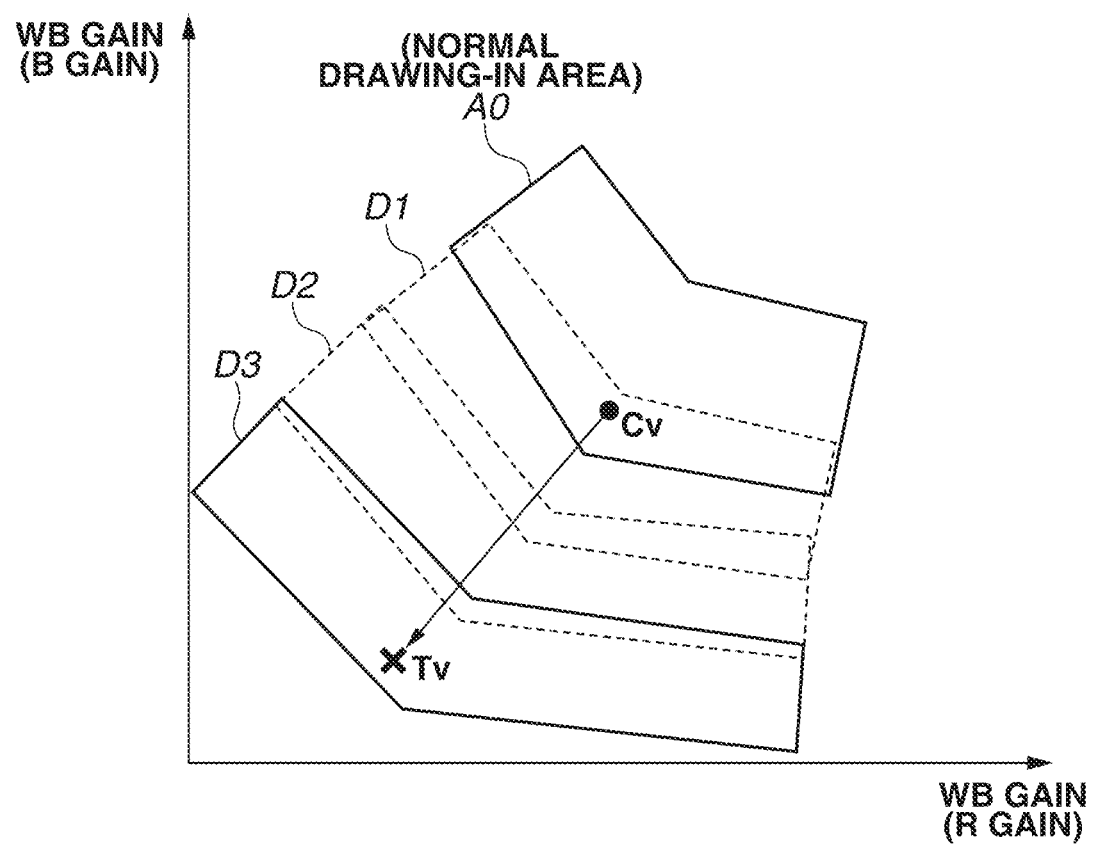
FIG. 6 illustrates a fourth example of WB gain control according to the first exemplary embodiment.

FIG. 6 is an example illustrating a fourth example of the WB control according to the present exemplary embodiment.

In the first example of the WB control, the areas A1, A2, and A3, which are the drawing-in areas set by stages in advance by the area shift control unit 104, are each set to have the same shape as the area A0, but the setting is not limited to this example. In the fourth example of the WB control illustrated in FIG. 6, the areas A1, A2, and A3, which are the drawing-in areas set by stages in advance in the first example of the WB control, are replaced with areas D1, D2, and D3. A point different from FIG. 3 is that the shape of the shifted area is not constant in a case where an image is affected by the infrared light component. The drawing-in area for correcting the WB with respect to the image affected by the infrared light component may be designed to be different from an area for correcting the WB with respect to the image based on the visible light component. In other words, it is possible to design the drawing-in area specialized for the influence of the infrared light component. Specifically, the drawing-in area corresponding to the ratio of the infrared light component can be designed based on the actual measured value and the spectral characteristic of the imaging sensor. For example, in a case where the R gain for adjusting the redness is to have a wider adjustment range, the area can be designed to have a larger width along an axis of the R gain as illustrated in the areas D1, D2, and D3 in FIG. 6.

As described above, the image processing apparatus according to the present exemplary embodiment can generate appropriate image data corresponding to a magnitude of a ratio of an infrared light component and a current WB gain information in a case where an input image is affected by the infrared light component.

An image processing apparatus according to a second exemplary embodiment is described. According to the first exemplary embodiment, control is performed to shift an area to either one of adjacent areas with respect to drawing-in areas that are set by stages in advance. In contrast, in WB control according to the second exemplary embodiment, a control method for shifting a drawing-in area is changed depending on a convergence speed of a WB gain control value. As the number of stages of the drawing-in areas that are set by stages in advance is larger, it is more effective in a case where influence of an infrared light component gradually changes. However, in a case where the influence of the infrared light component rapidly changes, responsiveness of the WB control may be slowed because processing for shifting the drawing-in area is increased. According to the second exemplary embodiment, the WB control can be appropriately performed without impairing the responsiveness of the WB control even in a case where the influence of the infrared light component rapidly changes.

Figure 7:
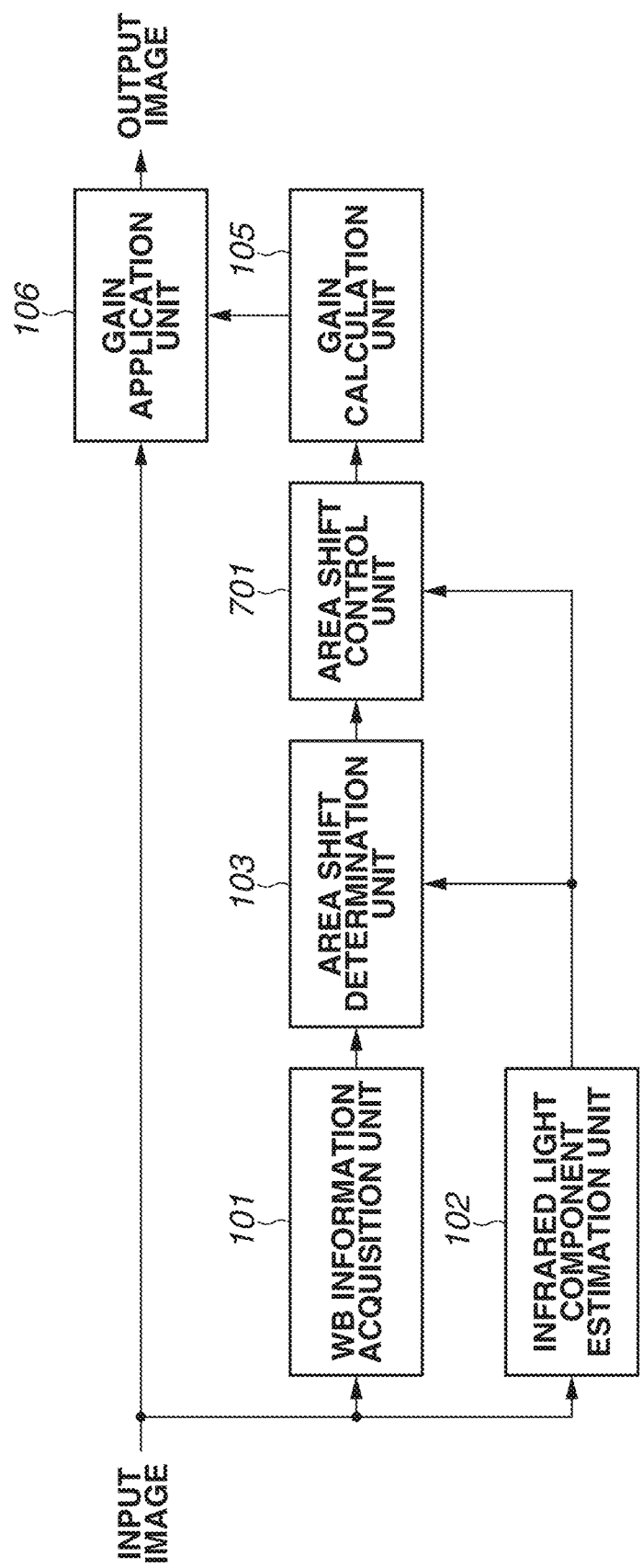
FIG. 7 illustrates a configuration example of an image processing apparatus according to a second exemplary embodiment.

FIG. 7 is a configuration diagram illustrating an example of a functional configuration of the image processing apparatus according to the second exemplary embodiment. The function units same as those in the first exemplary embodiment are denoted by the same reference numerals, and descriptions thereof are omitted. The function unit that has a function different from that according to the first exemplary embodiment is described below.

An area shift control unit 701 controls the drawing-in area in response to inputs from the infrared light component estimation unit 102 and the area shift determination unit 103 and outputs information about the drawing-in area that has been controlled to the gain calculation unit 105. Specifically, the area shift control unit 701 controls to which area the current drawing-in area is shifted based on a ratio of the infrared light component and a result of determining whether the area can be shifted so as to cancel the influence of the infrared light component. Details are described below, but it is not always necessary to shift an area to an adjacent area as long as a condition for shifting the area by stages is satisfied. For example, there is a case where the influence of the infrared light component rapidly changes, and there is a certain distance or more between the current WB gain control value and the WB gain target value. In a case where a condition for shifting the drawing-in area according to the first exemplary embodiment is satisfied, the drawing-in area is shifted as much as possible in a direction in which the influence of the infrared light component is canceled. "As much as possible" is to control the WB gain control value so as not to go out of the area due to the shift of the drawing-in area. In other words, the influence of the infrared light component rapidly changes, and as a difference between the WB gain control value and the WB gain target value becomes larger, a shift amount of the drawing-in area becomes larger.

Figure 8:
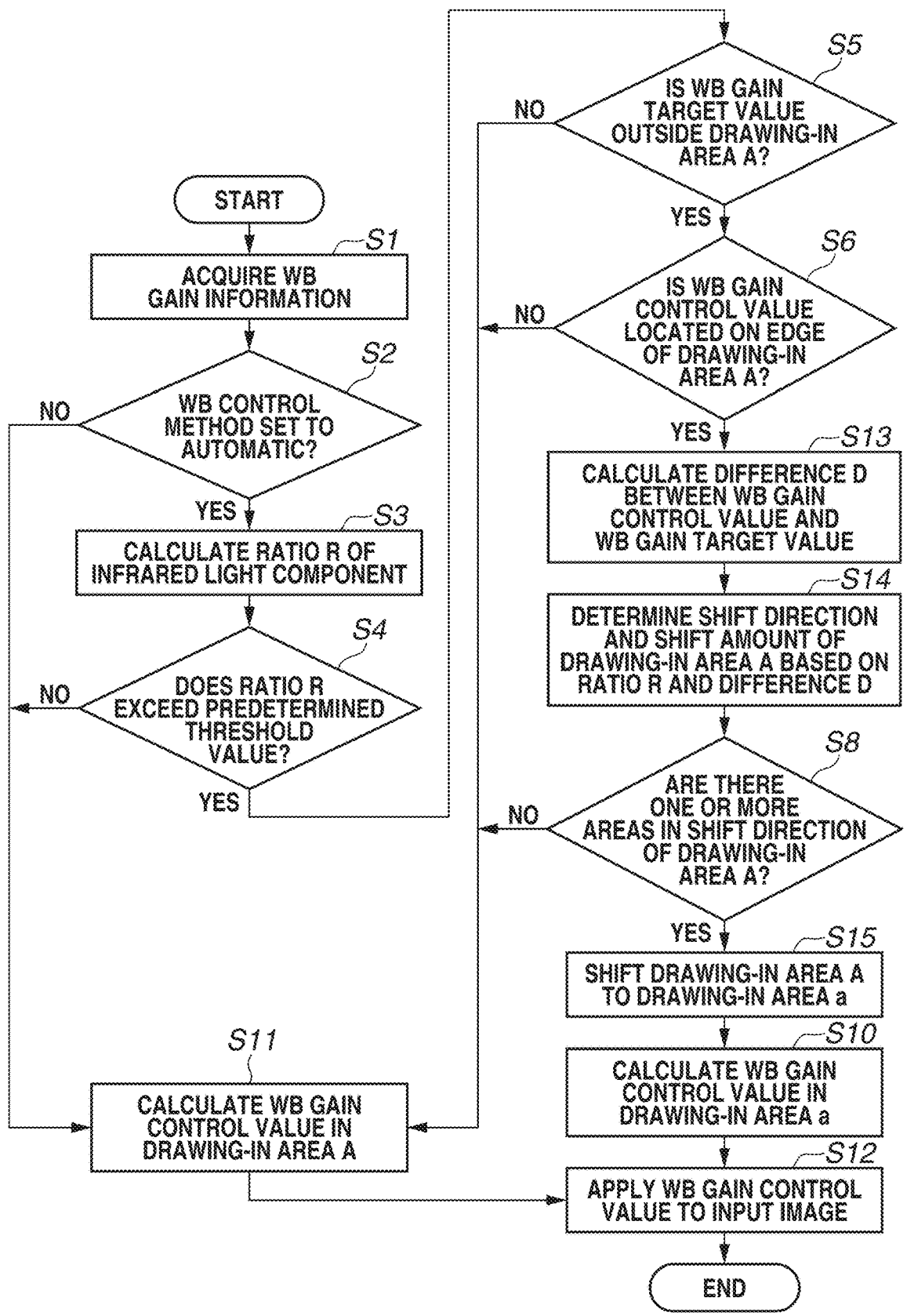
FIG. 8 is a flowchart illustrating a series of processes of a main part of image processing according to the second exemplary embodiment.

FIG. 8 is a flowchart illustrating an example of a series of processes of a main part of image processing executed by the image processing apparatus according to the present exemplary embodiment. The example of the image processing apparatus according to the present exemplary embodiment is described with reference to the flowchart in FIG. 8. The same processing steps as those according to the first exemplary embodiment are denoted by the same reference numerals, and the descriptions thereof are omitted. The processing steps different from those according to the first exemplary embodiment are described below.

In step S13, a difference D is calculated between the WB gain control value acquired by the WB information acquisition unit 101 and the WB gain target value. Specifically, in a case where the third condition and the fourth condition for shifting the area A are satisfied according to the first exemplary embodiment, the difference D is always generated between the WB gain control value and the WB gain target value, so that the difference D of which a value is not zero is calculated. In a case where the difference D is calculated, the processing proceeds to step S14.

In step S14, the shift direction and the shift amount of the area A are determined based on the ratio R of the infrared light component calculated by the infrared light component estimation unit 102 and the difference D calculated in step S13. For example, in a case where the ratio R exceeds the predetermined threshold value on the side affected by the infrared light component, the direction in which the area A is shifted is determined to be a direction in which the influence of the infrared light component is cancelled. On the other hand, in a case where the ratio R is lower than the predetermined threshold value in the direction in which the influence of the infrared light component is reduced, the direction in which the area A is shifted is determined to be the direction in which the influence of the visible light component is taken into consideration more than the influence of the infrared light component. The shift amount in the direction determined by the ratio R is determined based on the magnitude of the difference D. Specifically, the shift amount becomes larger as the difference D is larger, and the area a after the shift is set at a position farther away from the area A before the shift. In a case where the area after the shift is set at a farthest position, the area a after the shift is set so as to satisfy the condition for shifting the area by stages, which is described in detail below. Alternatively, the shift amount becomes smaller as the difference D is smaller, and the area a after the shift is set at a position close to the area A before the shift. In a case where the area after the shift is set at a nearest position, the area a after the shift is set to an adjacent area. In a case where the shift direction and the shift amount are determined, the processing proceeds to step S8.

In step S8, processing similar to that according to the first exemplary embodiment is performed, and in a case where the fifth condition for shifting the area is satisfied (YES in step S8), the processing proceeds to step S15. Alternatively, in a case where the fifth condition for shifting the area is not satisfied (NO in step S8), the processing proceeds to step S11.

In step S15, the area shift control unit 701 shifts the area A to the area a that is different from the area A based on the result of determining whether the area A can be shifted in step S8 and the shift direction and the shift amount of the area A determined in step S14. Specifically, there is one or more areas that can be shifted in the direction determined in step S14 based on the determination result in step S8 with respect to the current area A, and the area a after the shift is determined based on the shift amount determined in step S14 from among the areas that can be shifted. Although it is described in detail below with reference to the drawings, the area A is shifted to the shiftable area a, and the processing proceeds to step S10.

The WB control and its effect according to the second exemplary embodiment are described.

Figure 9:
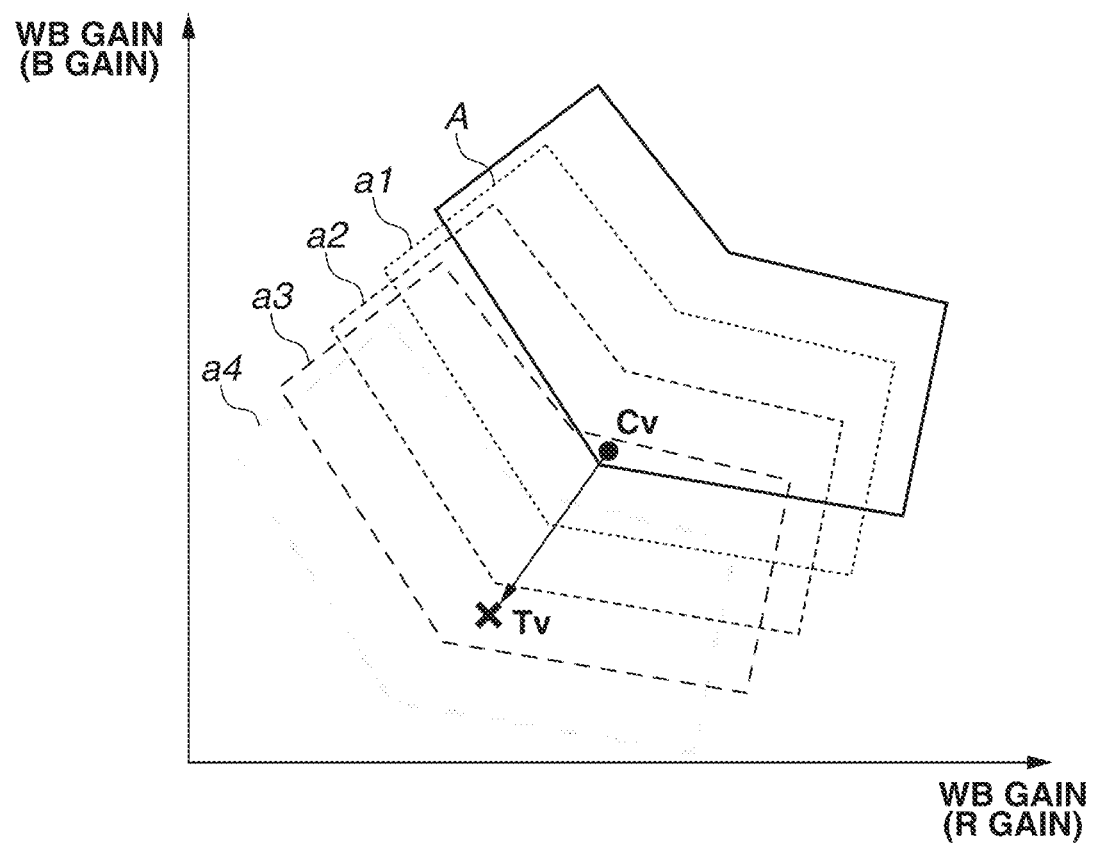
FIG. 9 illustrates an example of WB gain control according to the second exemplary embodiment.

FIG. 9 illustrates an example of the WB gain control according to the present exemplary embodiment. In FIG. 9, the black dot Cv and the black cross mark Tv are the same as those in FIG. 3, and thus the descriptions thereof are omitted. The predetermined area A represents an area in which the current WB gain control value is calculated, and in FIG. 9, the Cv is calculated near the boundary line of the area A, and the Tv is set on a lower left side in the drawing with respect to the area A by being affected by the infrared light component. At this time, the direction in which the area A is shifted is determined to be a direction of the Tv, and the area A is shifted to any of areas a1, a2, and a3 to which the area A can be shifted. A reason why an area a4 is not a candidate for the area after the shift is as follows. In a case where the drawing-in areas are set in advance as illustrated in FIG. 9 and the area A is shifted to the area a4, the area cannot be shifted by stages. Thus, the Cv may temporarily move out of the drawing-in area, and the WB gain control value may not be appropriately calculated. For example, in a case where the Cv is located on an upper side along a vicinity of the boundary line of the area A than the position indicated in FIG. 9, and in a case where the area a3 after the shift does not include the Cv, it is excluded from the candidate after the shift. In other words, the areas a1 and a2 are the candidates for the area after the shift in this case. A method for determining the area a after the shift, namely the shift amount of the current area A is determined based on a distance between the Tv and the Cv. Specifically, the shift amount of the area A becomes large as the distance between the Tv and the Cv is large, and the current area is shifted to the farthest area so as to satisfy the condition of the stepwise shift among the candidates of the area after the shift. In the case in FIG. 9, the distance between the Tv and the Cv is large, so that the current area A is shifted to the farthest area a3 among the candidates. A relationship of the distance between the Tv and the Cv with the shift amount is determined based on the number of areas set by stages in advance. As the number of areas to be set is smaller, the magnitude of the shift amount becomes smaller in a case where the distance between the Tv and the Cv becomes larger. On the other hand, in a case where the number of areas to be set is large, the magnitude of the shift amount becomes larger if the distance between the Tv and the Cv becomes larger. The shift amount according to the present exemplary embodiment does not indicate an absolute distance but indicates the number of steps for shifting the current area to the next area. In the example in FIG. 9, the shift amount from the area A to the area a3 is three. In other words, it means that the shift is performed by three stages.

In a case where a speed at which the WB gain control value converges to the WB gain target value is constant regardless of the WB gain target value, the area can be shifted to the adjacent area according to the first exemplary embodiment. In general WB control, a convergence speed of the WB gain control value may be changed depending on the WB gain target value so that the WB is achieved more quickly. Specifically, in a case where the WB gain target value is set to a value farther than the current WB gain control value, a change in the WB gain control value per unit processing is increased so that the WB gain control value quickly converges to the WB gain target value. In this case, in a case where a change amount of the WB gain control value becomes larger than the distance between the areas set by stages in advance, an appropriate WB gain control value cannot be calculated in some cases by the control method for shifting the area to the adjacent area. As an extreme example, in a case where a change amount of the Cv per unit processing is larger than an interval between the area A and the area a1 in FIG. 9, the Cv goes beyond the area a1 to the outside of the drawing-in area at timing when the area A is shifted to the area a1. In a case where the WB is controlled by limiting the change amount of the WB gain control value and giving a priority to the interval between the drawing-in areas, the responsiveness becomes slower than the WB control originally required.

In the example according to the present exemplary embodiment, in a case where the convergence speed of the WB gain control value is changed depending on the distance between the Tv and the Cv, the shift amount in the drawing-in area is controlled in response to the change amount of the Cv per unit processing, and thus the WB gain control value always exists inside the area after the shift. In other words, even in a case where the convergence speed of the WB gain control value is changed depending on the WB gain target value, the WB gain control value can be correctly calculated without deviating from the drawing-in area, and the WB control can be appropriately performed without slowing the responsiveness. In the example according to the present exemplary embodiment, a shift format of the drawing-in area is not limited, and the WB control according to the present exemplary embodiment can be performed on shift formats of the areas illustrated in, for example, FIGS. 4, 5, and 6.

Figure 10:
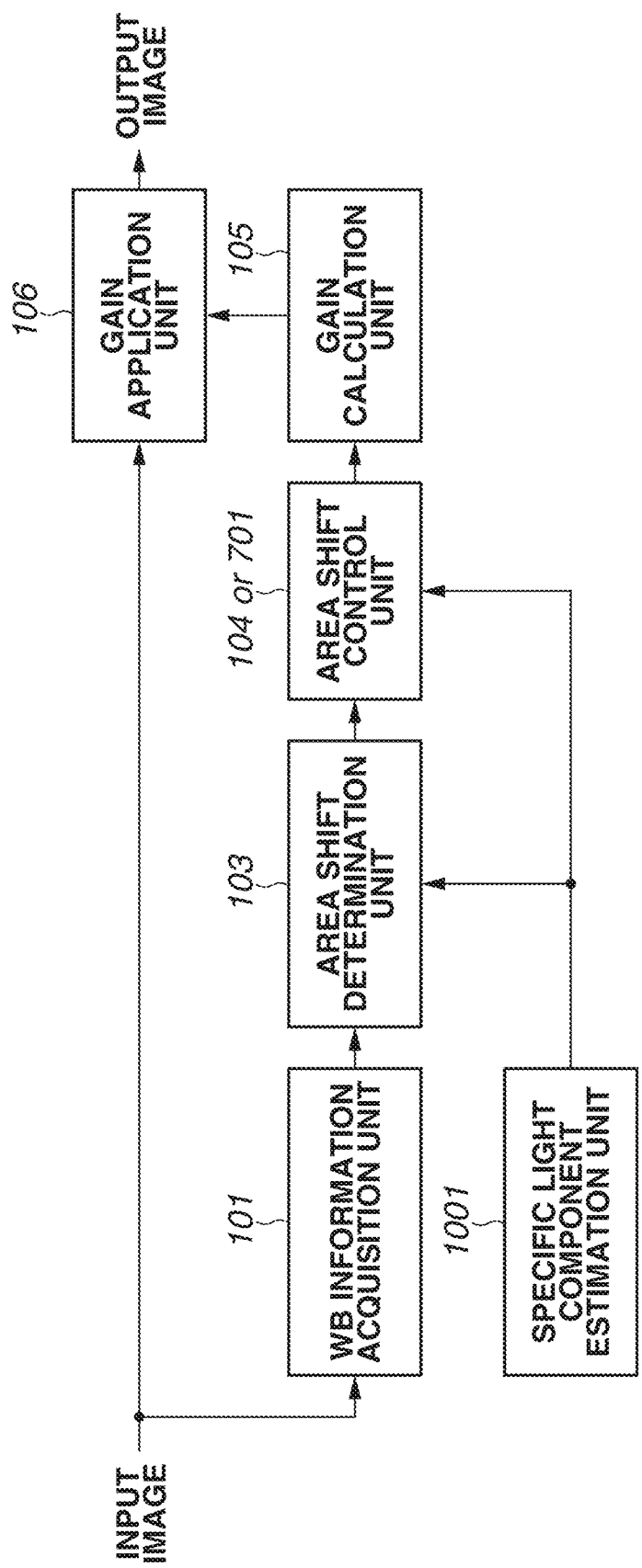
FIG. 10 illustrates a configuration example of the image processing apparatus according to the first and the second exemplary embodiments.

FIG. 10 is a block diagram illustrating a configuration example of an example of the WB control in a case where influence of a specific light component is taken into consideration. According to the exemplary embodiments already described above, the WB control is performed on the influence of the infrared light component. In contrast, in the present WB control example, the WB control is performed to cancel the influence of the specific light component. The specific light component is a specific color component that a user can freely determine. For example, the present example is effective in a case where a user wants to control the drawing-in area with respect to a blue component, assuming that the WB control is performed in the sea. The function units same as those in the first and the second exemplary embodiments are denoted by the same reference numerals, and descriptions thereof are omitted. The present WB control example describes that a user can arbitrarily design a shift limit area corresponding to the area A3 in FIG. 3 with respect to influence of arbitrary ambient light. The processing related to the control to shift the area in which an appropriate WB gain control value is calculated by stages is not changed in the present WB control example. In other words, the WB control can be appropriately performed by shifting the drawing-in area by stages according to the first and the second exemplary embodiments not only for the influence of the infrared light component, and a user can freely design the shift limit area at that time.

Figure 11:
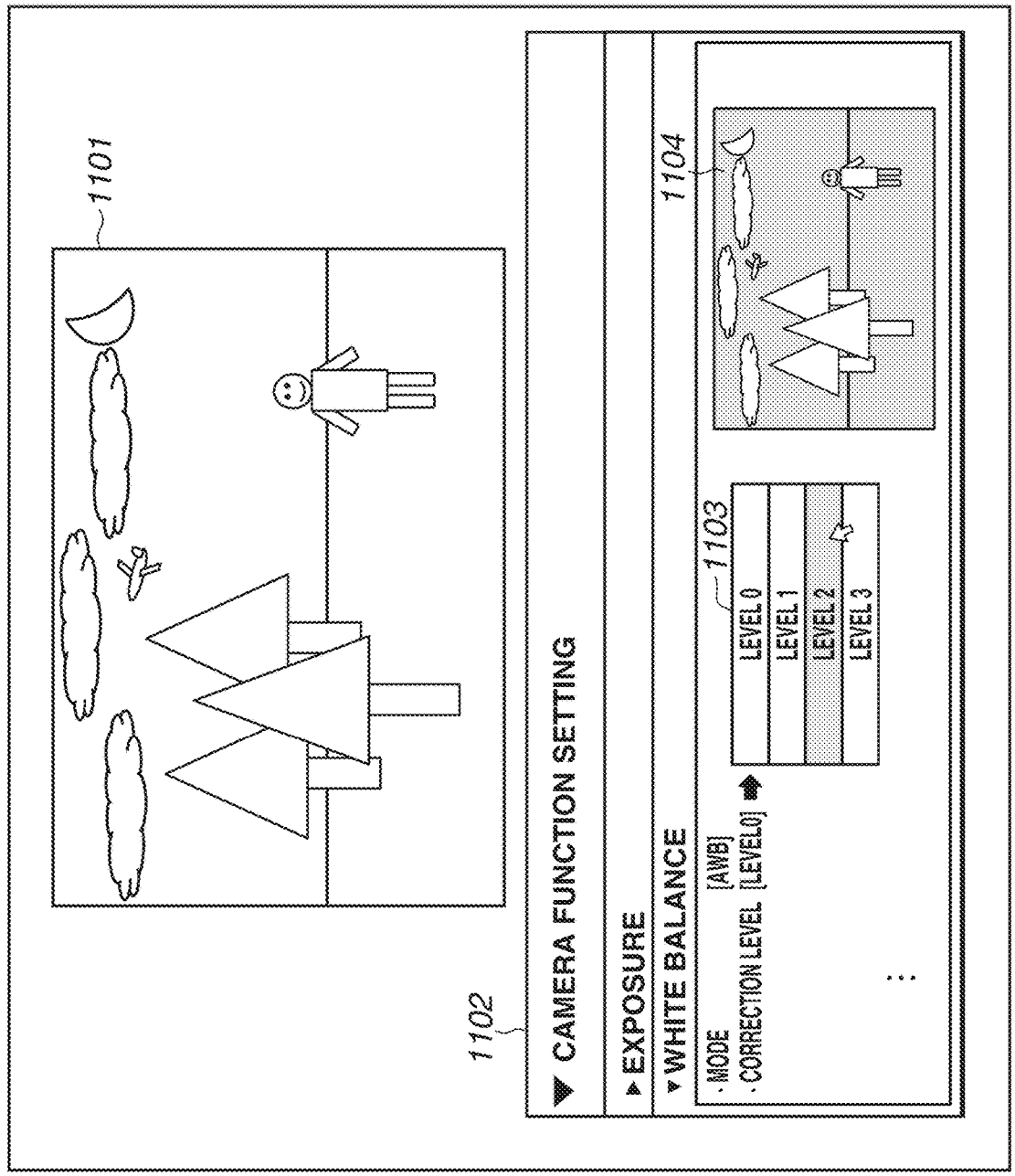
FIG. 11 illustrates a configuration example of a user interface (UI) according to a third exemplary embodiment.

FIG. 11 illustrates a configuration example of a graphical user interface (GUI) according to a third exemplary embodiment. A user interface (UI) 1101 outputs a video of an imaging environment at a current camera setting. A UI 1102 includes items for setting functions of the camera such as white balance and exposure. For example, with a white balance function, it is possible to set mode specification of the white balance, specification of a correction level for considering the influence of the infrared light component and the like, the R gain or the B gain, and the like. A UI 1103 illustrates a part for setting the correction level for considering the influence of the infrared light component and the like in the white balance function. For example, in the case of the WB gain control illustrated in FIG. 3 according to the first exemplary embodiment, there are four stages in the drawing-in areas from the normal drawing-in area A0 to the shift limit A3, so that there are four stages of the correction levels (the WB gain control values) corresponding to the stages. In FIG. 3, as the drawing-in area is shifted farther in a direction in which the infrared light component ratio is higher (an intersection point of a vertical axis and horizontal axis), stronger correction is performed to cancel the influence of the infrared light component, so that a color balance may be greatly disturbed depending on the imaging environment. A UI is provided on which a user can select a position of the shift limit in an actual imaging environment. In the WB control example in FIG. 3, in a case where the normal drawing-in area A0 is regarded as a correction level 0, the shift limit A3 is regarded as a correction level 3, and a user can select a level from four levels of the correction levels 0 to 3. In order to enable a user to visually determine a correction result with respect to the current imaging environment in selecting each correction level, an image of the correction result is virtually generated and displayed as illustrated in a UI 1104. Alternatively, as illustrated in FIG. 12, a UI is provided in which images of the correction results generated are arranged in different windows, and a user can determine the correction level by selecting one of the arranged images. In other words, a plurality of images as results of the stepwise change from the drawing-in area A0 to the drawing-in area A3 is displayed in a selectable manner In the plurality of images, the correction level (the WB gain control value) corresponding to the image selected by the user is applied to the input image. A position of the shift limit is determined based on the correction level. For this reason, the user can freely determine the correction level for cancelling the influence of the infrared light component in the actual imaging environment and visually determine the image by the provided UI corresponding to the correction level, so that the user can easily select the intended correction level. In the present example, the number of correction level stages including a case where the correction is not performed is set to four based on the WB control example in FIG. 3, but the number of correction level stages may be at least two. For example, if the case where the correction is not performed is included, at least two stages of the correction level 0 and the correction level 1 may be sufficient. If the case where the correction is not performed is not included, at least two stages of the correction level 1 and the correction level 2 may be sufficient. The display example in FIG. 12 is arrangement of two rows and two columns, but an arrangement pattern may not be fixed as long as the images of the correction results can be arranged. A similar UI can be provided not only for a case where the influence of the infrared light component is taken into consideration but also for a case where the influence of the specific light component is taken into consideration.

The example in which the image processing apparatus according to the above-described exemplary embodiment is applied to the image capturing apparatus is described, but the image processing apparatus may be realized by an information processing apparatus (a computer) such as a personal computer (PC) connected to the image capturing apparatus and a smartphone. In this case, the image capturing apparatus outputs raw data captured by an imaging unit, imaging parameters indicating an exposure time, a frame rate, an exposure setting value, and the like as well as information indicating presence or absence of the influence of the infrared light component on the color of the input image to the computer. The information indicating the presence or absence of the influence of the infrared light may be input by a user. The computer performs image processing similar to that described in the above exemplary embodiments.

Figure 13:
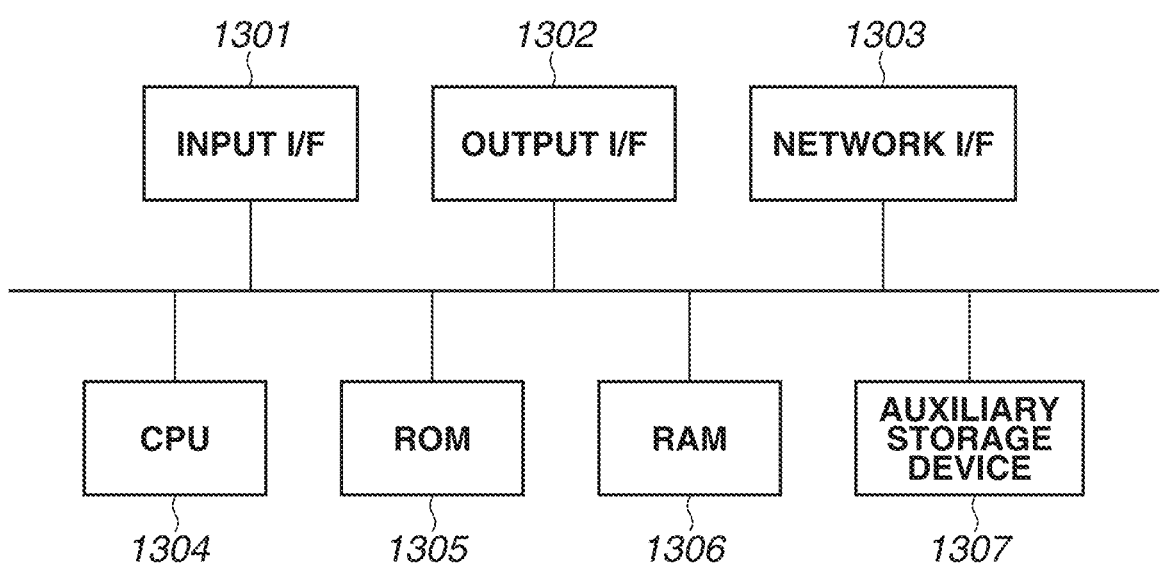
FIG. 13 illustrates a hardware configuration of the image processing apparatus according to the first to the third exemplary embodiments.

FIG. 13 illustrates a hardware configuration of the image processing apparatus according to the first to the third exemplary embodiments. The image processing apparatus according to the first to the third exemplary embodiments includes an input interface (I/F) 1301, an output I/F 1302, a network I/F 1303, a central processing unit (CPU) 1304, a read-only memory (ROM) 1305, a random access memory (RAM) 1306, and an auxiliary storage device 1307. Each unit in the image processing apparatus transmits information via a bus.

The input I/F 1301 is an interface for receiving an instruction from a user to the image processing apparatus and includes a mouse, a keyboard, and a joystick. The input I/F 1301 receives an operation by the user and inputs various instructions to the CPU 1304.

The output I/F 1302 is an interface for outputting information (for example, an image subjected to image processing and a control value related to the WB control) from the image processing apparatus and includes, for example, a liquid crystal display and a light emitting diode (LED) display. The output I/F 1302 displays a GUI for a user to operate the image processing apparatus and the like.

The input I/F 1301 and the output I/F 1302 may have an integrated configuration such as a touch panel display. In each of the first to the third exemplary embodiments, the input I/F 1301 and the output I/F 1302 are not essential elements. For example, the network I/F 1303 may receive an operation instruction from a user and transmit an output image from the image processing apparatus. In this case, the input I/F 1301 and the output I/F 1302 are not necessary.

The network I/F 1303 is an interface for communicating with an information processing apparatus such as a PC and a smartphone via a network such as a local area network (LAN). The network I/F 1303 includes, for example, a terminal into which a LAN cable is inserted and an antenna for performing wireless communication.

The CPU 1304 controls an entire image processing apparatus using a computer program and data stored in the ROM 1305 and the RAM 1306 and also executes the above-described WB control and the like. The image processing apparatus may include one or a plurality of pieces of dedicated hardware different from the CPU 1304, and the dedicated hardware may executes at least a part of the processing by the CPU 1304. Examples of the dedicated hardware include an application specific integrated circuit (ASIC), a field programmable gate array (FPGA), and a digital signal processor (DSP). The ROM 1305 stores a program that does not require a change and the like. The RAM 1306 temporarily stores a program and data supplied from the auxiliary storage device 1307, data supplied from the outside via the network I/F 1303, and the like.

The auxiliary storage device 1307 includes a hard disk drive (HDD) and stores various data such as image data, an imaging parameter, and information indicating the presence or absence of the influence of the infrared light.

The CPU 1304 also operates as an operation control unit that controls the input I/F 1301 and a display control unit that controls the output I/F 1302. Alternatively, the CPU 1304 may be configured to transmit control information for controlling an external operation unit and a display unit via the network I/F 1303. The CPU 1304 performs control to display the GUI described according to the third exemplary embodiment.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-146785, filed Sep. 9, 2021, and Japanese Patent Application No. 2022-106164, filed Jun. 30, 2022, which are hereby incorporated by reference herein in their entirety.

What is claimed is:

1. An apparatus comprising:
   at least one processor; and
   a memory coupled to the at least one processor, the memory storing instructions that, when executed by the at least one processor, cause the at least one processor to function as:
   an acquisition unit configured to acquire a first control value related to white balance based on an input image;
   a determination unit configured to determine whether a first area including the acquired first control value is changeable;
   a control unit configured to change the first area to a second area based on whether the first area including the acquired first control value is changeable; and
   a calculation unit configured to calculate a second control value related to the white balance to be applied to the input image in the second area in a case where the first area is changed to the second area, an estimation unit configured to estimate influence of an infrared light component in the input image,
wherein the determination unit determines whether the first area is changeable based on the estimated influence of an infrared light component, and
wherein the first area is changed to the second area by stages.

2. The apparatus according to claim 1, wherein the control unit sets an area closest to the first area as the second area among a plurality of areas stored in a storage device.

3. The apparatus according to claim 2, wherein the acquisition unit acquires information related to a control method of the white balance in a capturing apparatus connected to the apparatus.

4. The apparatus according to claim 3, wherein the acquisition unit acquires a control value calculated in the first area based on a characteristic amount related to a color of the input image as the first control value.

5. The apparatus according to claim 4, wherein the acquisition unit acquires a target value to be set to appropriately control the white balance of the input image.

6. The apparatus according to claim 5, wherein the control unit controls an amount by which the first area is to be changed based on a difference between the control value and the target value.

7. The apparatus according to claim 2, wherein the control unit changes the first area to the second area so that the first control value is included in the second area.

8. The apparatus according to claim 2,
wherein the at least one processor further functions as an estimation unit configured to estimate influence of a specific color component in the input image, and
wherein the determination unit determines whether the first area is changeable based on the estimated influence of a specific color component.

9. The apparatus according to claim 8,
wherein the estimation unit calculates a ratio of the specific color component in the input image, and
wherein the determination unit determines whether the first area is changeable based on the ratio of the specific color component.

10. The apparatus according to claim 8, wherein the control unit changes the first area to the second area so as to cancel the influence of the specific color component.

11. The apparatus according to claim 1, wherein the control unit sets an area that is changed from the first area by a predetermined amount as the second area.

12. The apparatus according to claim 1,
wherein the estimation unit calculates a ratio of the infrared light component in the input image, and
wherein the determination unit determines whether the first area is changeable based on the ratio of the infrared light component.

13. The apparatus according to claim 12, wherein the control unit changes the first area to the second area so as to cancel the influence of the infrared light component.

14. A method comprising:
acquiring a first control value related to white balance based on an input image;
determining whether a first area including the acquired first control value is changeable;
changing the first area to a second area based on whether the first area including the acquired first control value is changeable; and
calculating a second control value related to the white balance to be applied to the input image in the second area in a case where the first area is changed to the second area,
estimating influence of an infrared light component in the input image,
determining whether the first area is changeable based on the estimated influence of an infrared light component, and
wherein the first area is changed to the second area by stages.

15. A non-transitory computer-readable storage medium storing a program for causing a computer to execute a method, the method comprising:
acquiring a first control value related to white balance based on an input image;
determining whether a first area including the acquired first control value is changeable;
changing the first area to a second area based on whether the first area including the acquired first control value is changeable; and
calculating a second control value related to the white balance to be applied to the input image in the second area in a case where the first area is changed to the second area,
estimating influence of an infrared light component in the input image,
determining whether the first area is changeable based on the estimated influence of an infrared light component, and
wherein the first area is changed to the second area by stages.

16. An apparatus comprising:
at least one processor; and
a memory coupled to the at least one processor, the memory storing instructions that, when executed by the at least one processor, cause the at least one processor to function as:
an acquisition unit configured to acquire a first control value related to white balance based on an input image;
a determination unit configured to determine whether a first area including the acquired first control value is changeable;
a control unit configured to change the first area to a second area based on whether the first area including the acquired first control value is changeable; and
a calculation unit configured to calculate a second control value related to the white balance to be applied to the input image in the second area in a case where the first area is changed to the second area,
wherein the control unit sets an area closest to the first area as the second area among a plurality of areas stored in a storage device,
wherein the determination unit determines whether the first area is changeable based on whether the first control value is located near a boundary line of the first area, and
wherein the first area is changed to the second area by stages.

17. A method comprising:
acquiring a first control value related to white balance based on an input image;
determining whether a first area including the acquired first control value is changeable;
changing the first area to a second area based on whether the first area including the acquired first control value is changeable; and calculating a second control value related to the white balance to be applied to the input image in the second area in a case where the first area is changed to the second area, wherein the control unit sets an area closest to the first area as the second area among a plurality of areas stored in a storage device, wherein the determining determines whether the first area is changeable based on whether the first control value is located near a boundary line of the first area, and wherein the first area is changed to the second area by stages.

18. A non-transitory computer-readable storage medium storing a program for causing a computer to execute a method, the method comprising:

acquiring a first control value related to white balance based on an input image;

determining whether a first area including the acquired first control value is changeable;

changing the first area to a second area based on whether the first area including the acquired first control value is changeable; and calculating a second control value related to the white balance to be applied to the input image in the second area in a case where the first area is changed to the second area, wherein the control unit sets an area closest to the first area as the second area among a plurality of areas stored in a storage device, wherein the determining determines whether the first area is changeable based on whether the first control value is located near a boundary line of the first area, and wherein the first area is changed to the second area by stages.

19. An apparatus comprising:

at least one processor; and a memory coupled to the at least one processor, the memory storing instructions that, when executed by the at least one processor, cause the at least one processor to function as:

an acquisition unit configured to acquire a first control value related to white balance based on an input image;

a determination unit configured to determine whether a first area including the acquired first control value is changeable;

a control unit configured to change the first area to a second area based on whether the first area including the acquired first control value is changeable; and a calculation unit configured to calculate a second control value related to the white balance to be applied to the input image in the second area in a case where the first area is changed to the second area, wherein the first area is changed to the second area by stages, wherein the calculation unit calculates a plurality of control values related to the white balance to be applied to the input image in each of a plurality of areas obtained by changing the first area by stages, and wherein the at least one processor further functions as a display control unit configured to cause a display unit to display a plurality of images, in a selectable manner, to be generated by applying the plurality of control values to the input image.

20. A method comprising:

acquiring a first control value related to white balance based on an input image;

determining whether a first area including the acquired first control value is changeable;

changing the first area to a second area based on whether the first area including the acquired first control value is changeable; and calculating a second control value related to the white balance to be applied to the input image in the second area, in a case where the first area is changed to the second area, wherein the first area is changed to the second area by stages, and further comprising:

calculating a plurality of control values related to the white balance to be applied to the input image in each of a plurality of areas obtained by changing the first area by stages, and displaying a plurality of images, in a selectable manner, to be generated by applying the plurality of control values to the input image.

21. A non-transitory computer-readable storage medium storing a program for causing a computer to execute a method, the method comprising:

acquiring a first control value related to white balance based on an input image;

determining whether a first area including the acquired first control value is changeable;

changing the first area to a second area based on whether the first area including the acquired first control value is changeable; and calculating a second control value related to the white balance to be applied to the input image in the second area, in a case where the first area is changed to the second area, wherein the first area is changed to the second area by stages, and further comprising:

a plurality of control values related to the white balance to be applied to the input image in each of a plurality of areas obtained by changing the first area by stages; and displaying a plurality of images, in a selectable manner, to be generated by applying the plurality of control values to the input image.

* * * * *